United States Patent
Bouquet et al.

(10) Patent No.: US 11,584,807 B2
(45) Date of Patent: Feb. 21, 2023

(54) STYRENIC POLYMERS HAVING REDUCED TRIMER CONTENT

(71) Applicant: TRINSEO EUROPE GMBH, Horgen (CH)

(72) Inventors: Gilbert Bouquet, Ghent (BE); Fredericus Slijkerman, Terneuen (NL)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 17/616,849

(22) PCT Filed: Jun. 10, 2020

(86) PCT No.: PCT/EP2020/066064
§ 371 (c)(1),
(2) Date: Dec. 6, 2021

(87) PCT Pub. No.: WO2020/249606
PCT Pub. Date: Dec. 17, 2020

(65) Prior Publication Data
US 2022/0213237 A1    Jul. 7, 2022

(30) Foreign Application Priority Data
Jun. 12, 2019 (EP) .................................... 19179665

(51) Int. Cl.
*C08F 4/38* (2006.01)
*C08F 279/02* (2006.01)

(52) U.S. Cl.
CPC .............. *C08F 4/38* (2013.01); *C08F 279/02* (2013.01)

(58) Field of Classification Search
CPC ......... C08F 212/10; C08F 212/14; C08F 4/38
See application file for complete search history.

(56) References Cited

U.S. PATENT DOCUMENTS

| | | | |
|---|---|---|---|
| 2,727,884 A | 12/1955 | McDonald | |
| 3,243,481 A | 3/1966 | Ruffing | |
| 3,660,535 A | 5/1972 | Finch | |
| 4,129,703 A * | 12/1978 | Kamath | C08F 4/38 526/228 |
| 4,239,863 A | 12/1980 | Bredeweg | |
| 4,572,819 A | 2/1986 | Priddy et al. | |
| 1,585,825 A | 4/1986 | Wesselmann | |
| 4,666,987 A | 5/1987 | Burmester et al. | |
| 5,286,792 A | 2/1994 | Wu et al. | |
| 5,994,463 A * | 11/1999 | Eckel | C08L 51/04 264/331.21 |
| 2001/0031827 A1 | 10/2001 | Virkler et al. | |
| 2010/0125122 A1 * | 5/2010 | Bouquet | C08F 2/38 525/232 |
| 2011/0269907 A1 * | 11/2011 | Kumazawa | C08L 67/04 525/190 |
| 2016/0148717 A1 * | 5/2016 | Kikuchi | H01B 1/24 252/511 |
| 2018/0346613 A1 * | 12/2018 | Hosman | C08F 2/34 |

FOREIGN PATENT DOCUMENTS

| | | |
|---|---|---|
| EP | 412801 A1 | 2/1991 |
| JP | 2001026619 A | 1/2001 |

OTHER PUBLICATIONS

International Search Report and Written Opinion in co-pending PCT Application No. PCT/EP2020/066064 dated Jul. 31, 2020 (13 pages).
Written Opinion of the International Preliminary Examining Authority dated May 14, 2021 (5 pages).
International Preliminary Reporton Patentability for PCT/EP2020/066064 dated Sep. 2, 2021 (11 pages).
Modern Sytrenic Polymers, edited by John Schiers and Duane Priddy, ISBN 0 471 497525, 6 pages.

* cited by examiner

*Primary Examiner* — Jeffrey C Mullis
(74) *Attorney, Agent, or Firm* — Young Basile Hanlon & MacFarlane, P.C.

(57) ABSTRACT

Disclosed are styrenic polymers made by a mass or solution process, where the amount of trimer consisting of styrene and/or acrylonitrile is less than about 0.50 weight percent. Also disclosed is a method of minimizing the amount of trimer consisting of styrene and/or acrylonitrile in styrenic polymers made by a mass or solution process. The method includes the steps of lowering the temperature of the polymerization reaction mixture and including more than one initiator in the polymerization reaction mixture.

9 Claims, 1 Drawing Sheet

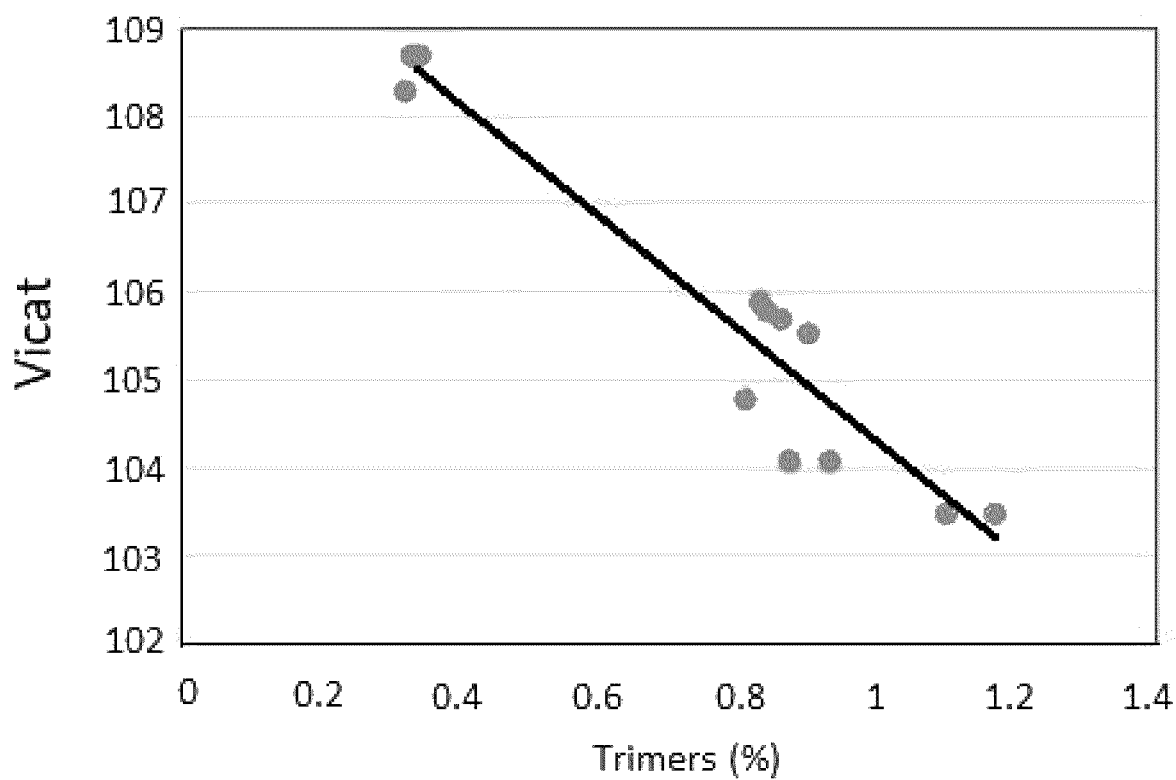

STYRENIC POLYMERS HAVING REDUCED TRIMER CONTENT

CROSS-REFERENCE TO RELATED APPLICATION(S)

This application is a 371 application of International Application No. PCT/EP2020/066064, filed on Jun. 10, 2020, which claims priority from European Patent Application No. 19179665.5 filed on Jun. 12, 2019.

TECHNICAL FIELD

The invention relates to styrenic polymers made by a mass or solution process. In particular the invention relates to forming styrenic polymers where the amount of trimers containing styrene and/or acrylonitrile is less than about 0.50 weight percent made by a mass or solution process.

BACKGROUND

Polymers prepared from vinylidene substituted aromatic monomers, such as styrene, are used in a number of polymeric systems, including foams, packaging (food packaging), medical, electronic, optical, appliance and automotive applications. In certain applications the glass transition temperature of homopolymers of vinylidene substituted aromatic monomers is lower than required for the applications. Examples of styrenic polymers include, for example, general purpose polystyrene (GPPS) and high impact polystyrene (HIPS)

Polymers of vinyl or vinylidene substituted aromatic monomers do not exhibit great chemical resistance and modified polymers containing vinylidene substituted aromatic monomers have been developed to improve the chemical resistance. Some modified polymers may be copolymers such, as for example, styrene-acrylonitrile (SAN). Other modified polymers may also include butadiene-based rubber, for example, copolymers of styrene and acrylonitrile modified with polybutadiene rubber, commonly referred to as acrylonitrile-butadiene-styrene (ABS).

Trimer formation during synthesis of styrenic polymers such as those described above, by mass or solution processes reduces the Vicat of the polymer, which diminishes the application window of the polymer. One method for increasing the Vicat of a resin is through addition of N-phenyl maleimide as a co-monomer. However, use of N-phenyl maleimide is costly, requires multiple additions and leads to discoloration and lower ductility of the resultant polymer.

Thus it would be desirable, where N-phenyl maleimide is used to increase Vicat, the amount employed may be reduced or eliminated using a method such as mass or solution process which will result in cost savings and superior polymer properties. Thus, there is a need for styrenic polymers, which may include N-phenyl maleimide at reduced concentrations, having improved properties using a cost effective method.

SUMMARY

Disclosed herein are styrenic polymers which satisfy these and other needs. The styrenic polymers, compositions and articles disclosed may contain less than about 0.50 weight percent of trimers consisting of styrene and/or acrylonitrile. The styrenic polymer may include N-phenyl maleimide in a concentration of less than about 10 weight percent and greater than about 0.1 weight percent. The styrenic polymer may also include (meth)acrylic monomer.

Also disclosed is a method of reducing the amount of trimers consisting of styrene and/or acrylonitrile in a styrenic polymer made by mass or solution process. The method includes performing the polymerization reaction at a reaction temperature in combination with more than one initiator in the polymerization reaction mixture at the outset of the polymerization reaction, wherein the reaction temperature is lower than typically used. The method surprisingly allows the reduction of the trimers present in the polymer even at standard or even lowered devolatilization temperatures and pressures. The described method significantly reduces trimer formation in mass or solution process and thus provides thermoplastics with improved Vicat and better property balance.

BRIEF DESCRIPTION OF THE DRAWING

The FIGURE illustrates the effect on Vicat of varying trimer amount in a high heat ABS polymer which includes a constant amount of N-phenyl maleimide.

DETAILED DESCRIPTION

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

One or more as used herein means that at least one, or more than one, of the recited components may be used as disclosed. Residual content of a component refers to the amount of the component present in free. Typically, the residual content of a component can be calculated from the ingredients utilized to prepare the component or composition. Alternatively, it can be determined utilizing known analytical techniques. Heteroatom as used herein comprise nitrogen, oxygen, sulfur, and silicon; more preferred heteroatoms include nitrogen and oxygen with oxygen most preferred. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. Valence as used herein means a covalent bond between a hydrocarbyl or hydrocarbylene group and another group such as a carbonyl, oxygen, nitrogen or sulfur containing group or atom, or the referenced base compound.

As used herein percent by weight or parts by weight refer to, or are based on, the weight of the compositions unless otherwise specified.

The copolymers disclosed herein contain vinyl or vinylidene substituted aromatic monomers. Vinylidene substituted aromatic monomers comprise vinylidene, alkenyl groups bonded directly to aromatic structures. The vinyl or vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinyl or vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinyl or vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinyl or vinylidene substituted aromatic monomers include styrene, alpha methyl styrene, N-phenyl-maleimide and chlorinated styrenes; or alpha-methyl styrene and styrene. The vinyl or vinylidene substituted aromatic monomers may be mono-vinyl or vinylidene aromatic monomers, which contain one unsaturated group. Vinyl and vinylidene aromatic monomers include but are not limited to those described in U.S. Pat. Nos. 4,666,987; 4,572,819 and 4,585,825, which are herein incorporated by reference. The monomer may correspond to the formula:

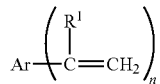

where $R^1$ is separately in each occurrence hydrogen or methyl and Ar is separately in each occurrence an aromatic group. Ar may contain one or more aromatic rings, may contain one or two aromatic rings, or may contain one aromatic ring, n is separately in each occurrence 1 to 3, 1 to 2 or 1. The aromatic rings can be unsubstituted or substituted with a substituent that does not interfere with polymerization of the vinyl or vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinyl or vinylidene substituted aromatic monomers may be present in the copolymers in a sufficient amount such that the polymer exhibits the advantageous properties associated with polymers of vinyl or vinylidene substituted aromatic monomers, for instance polystyrene. Among the advantageous properties of polymers of vinyl or vinylidene substituted monomers include glass transition temperatures of about 100° C. or greater, transparency where desired for the use, high heat deflection temperatures, and the like. The copolymers disclosed herein contain vinyl or vinylidene substituted aromatic monomers in an amount of about 10 percent by weight of the copolymers or greater, about 15 percent by weight or greater or about 20 percent by weight or greater. The copolymers disclosed herein contain vinyl or vinylidene substituted aromatic monomers in an amount of about 90 percent by weight of the polymerizable compositions or copolymers or less, about 85 percent by weight or less or about 80 percent by weight or less. The recited amounts may relate to the amounts of vinyl or vinylidene substituted aromatic monomers.

The compositions may contain branching agents commonly used in vinyl or vinylidene aromatic based polymers. The branching agents may be vinyl or vinylidene substituted aromatic monomers having 2 or more vinyl or vinylidene groups (e.g., divinylbenzene). Other branching agents may include other difunctional and in general multifunctional (functionality>2) monomers, multifunctional initiators and multifunctional chain transfer agents and the like. The branching agents may be present in the polymerizable compositions in an amount of about 0.001 percent by weight of the composition or greater, about 0.002 percent by weight or greater or about 0.003 percent by weight or greater. The branching agents may be present in the polymerizable compositions in an amount of about 0.5 percent by weight of the composition or less, about 0.2 percent by weight or less or about 0.1 percent by weight or less.

The copolymers disclosed herein may further comprise one or more (meth)acrylates. (Meth) acrylate as used herein refers to compounds having a vinyl group or vinylidene bonded to the carbonyl moiety of an alkyl ester wherein the carbon of the vinyl vinylidene group bonded to the carbonyl group further has a hydrogen or a methyl group bonded thereto. Illustrative (meth)acrylates useful include those that correspond to the formula:

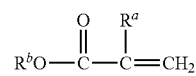

wherein $R^a$ is separately in each occurrence H or —$CH_3$; and $R^b$ may be a $C_1$ to $C_{-30}$ alkyl group or $C_{1-10}$ alkyl group. Examples of the one or more (meth)acrylates include lower alkyl (meth)acrylates, such as methyl (meth)acrylate, ethyl (meth)acrylate, propyl (meth)acrylate, butyl (meth)acrylate, pentyl (meth)(acrylate) and hexyl (meth) acrylate.

The one or more (meth)acrylates in the copolymers may be present in sufficient amount to provide the desired properties of the copolymer such as processability, practical toughness, refractive index, environmental stress crack resistance, hydrolytic stability, thermal stability, UV stability, impact resistance, weatherability, and the like. The copolymers disclosed herein contain (meth)acrylates in an amount of about 0 percent by weight of the polymerizable compositions or copolymers or greater, about 1 percent by weight or greater or about 2 percent by weight or greater. The copolymers disclosed herein contain (meth)acrylates in an amount of about 20 percent by weight of the copolymers or less, about 15 percent by weight or less, about 10 percent by weight or less, about 8 percent by weight or less or about 5 percent by weight or less.

The copolymers may include one or more unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles are used in the copolymers to enhance the glass transition temperature, chemical resistance and the like. The copolymers disclosed herein contain one or more unsaturated nitriles in an amount of about 0 percent by weight of the copolymers or greater, about 1 percent by weight or greater or about 2 percent by weight or greater. The copolymers may contain one or more unsaturated nitriles in an amount of about 40 percent by weight of the copolymers or less, about 35 percent by weight or less, about 30 percent by weight or less or about 25 percent by weight or less.

Other vinyl monomers may also be included in the copolymer, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide etc.; and the like. These additional comonomers can be incorporated in the composition in several ways including, interpolymerization with the vinylidene substituted aromatic containing copolymer and/or polymerization into polymeric components which can be combined, for example blended in to the matrix. If present, the amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The compositions disclosed may contain impact modifiers. The terms impact modifiers and rubbers are used interchangeably herein. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, and mixtures thereof. Also suitable are interpolymers of rubber-forming monomers with other copolymerizable monomers. The rubbers may be present in the formulated composition in sufficient amount to provide the desired impact properties to the composition. Desired impact properties include increased izod, charpy, gardner, tensile, falling dart, and the like. The compositions disclosed herein contain impact modifiers (rubbers) in an amount of about 0.5 percent by weight of the compositions or greater, about 1 percent by weight or greater or about 2 percent by weight or greater. The compositions disclosed herein contain impact modifiers (rubbers) in an amount of about 50 percent by weight of the compositions or less, about 45 percent by weight or less, about 40 percent by weight or less, about 30 percent by weight or less, about 20 percent by weight or less or about 10 percent by weight or less. The compositions disclosed herein contain the copolymer in an amount of about 0.5 percent by weight of the compositions or greater. The compositions disclosed herein contain copolymer in an amount of about 99.5 percent by weight of the compositions or less, 90 percent by weight of the compositions or less, 80 percent by weight of the compositions or less or 50 percent by weight of the compositions or less. Compositions, formulated compositions, as used in this context are the formulated compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material changes from a rigid glassy material to a soft material. Tg can be determined by differential scanning calorimetry (DSC). The diene rubber may have a cis content equal to or less than 99 percent or less than 97 percent. The cis content of the diene rubber may be equal to or greater than 20 percent or greater than 37 percent wherein the cis weight percent is based on the weight of the diene rubber. The rubber may be a 1,3-butadiene rubber having at least about 0 weight percent 1,2-vinyl or at least about 7 weight percent 1,2-vinyl based on the weight of the 1,3-butadiene rubber. The 1,3-butadiene rubber may have less than or equal to about 30 weight percent 1,2-vinyl or less than or equal to about 13 weight percent 1,2-vinyl based on the weight of the 1,3-butadiene rubber. The diene rubber may have a weight average molecular weight of at least about 100 kilogram per mole (kg/mol)—or a weight average molecular weight of at least about a 300 kg/mol. The diene rubber may have a weight-average molecular weight equal to or less than about 900 kg/mol or a weight average molecular weight equal to or less than 600 kg/mol. The diene rubber having a solution viscosity of at least 10 centiStokes (cSt) (10 percent (%) solution in styrene at 25° C.) or a solution viscosity of about 30 cSt. The diene rubber may have a solution viscosity equal to or less than about 500 cSt or equal to or less than about 400 cSt. The rubber, with graft and/or occluded polymers if present, is dispersed in the continuous matrix phase as discrete particles. The rubber particles may comprise a range of sizes having a monomodal, bimodal, or multimodal distribution. The average particle size of a rubber particle, as used herein, will, refer to the volume average diameter. The average particle diameter measurement generally includes the polymer grafted to the rubber particles. Unless otherwise specified, the rubber particle sizes disclosed and claimed herein are determined on a Coulter Multisizer II or II e with the ACCUCOMP™ Software Version 2.01. by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of NH$_4$SCN in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (μm), equal to or greater than about 0.1 micrometers, and about 0.5 micrometers. The average particle size of the rubber particles may be equal to or less than about 10 micrometers, equal to or less than about 5 micrometers, or equal to or less than about 4 micrometers.

The disclosed compositions may also optionally contain one or more additives that are commonly used in compositions of this type. Exemplary additives include: ignition resistant additives, stabilizers, colorants (e.g., pigments, carbon black, $TiO_2$, etc.), antioxidants (e.g., Irganox 1076 or Irgafos 178), adsorbers (e.g., zeolites, activated carbon, bamboo charcoal, etc.) antistats, silicon oils, flow enhancers, mold releases, etc. Exemplary ignition resistance additives include halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof.

If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

Also disclosed herein are exemplary vinyl or vinylidene substituted aromatic copolymers including acrylonitrile and styrene monomers in various proportions. The acrylonitrile-styrene polymers disclosed may contain styrene monomer in a concentration of about 25 percent by weight or more, about 50 percent by weight or more, or about 70 percent by weight or more and acrylonitrile monomer in a concentration of about 25 percent by weight or more, or about 50 percent by weight or more or more or about 70 percent by weight or more. The acrylonitrile-styrene polymers disclosed may contain styrene monomer at a concentration of, about 80 percent by weight or less, about 55 percent by weight or less or about 30 percent by weight or less and acrylonitrile monomer at a concentration of about 80 percent by weight or less, about 55 percent by weight or less, or less or about 30 percent by weight or less.

Also disclosed herein are exemplary vinyl or vinylidene substituted aromatic copolymers including acrylonitrile and styrene monomers and polybutadiene in various proportions. The acrylonitrile-butadiene-styrene polymers disclosed may contain styrene monomer in a concentration of about 25 percent by weight or more, about 40 percent by weight or more, or about 55 percent by weight or more, butadiene monomer in a concentration of about 5 percent by weight or more, or 10 percent by weight or more, acrylonitrile monomer in a concentration of about 5 percent by weight or more, or about 10 percent by weight or more or more or about 18 percent by weight or more. The acrylonitrile-butadiene-styrene polymers disclosed may contain styrene monomer at a concentration of about 90 percent by weight or less, about 85 percent by weight or less, about 75 percent by weight or less or about 65 percent by weight or less, butadiene monomer at a concentration of about 35 percent by weight or less, about 25 percent by weight or less, or about 18 percent by weight or less, acrylonitrile monomer at a concentration of about 40 percent by weight or less, about 35 percent by weight or less, about 25 percent by weight or less or about 18 percent by weight or less.

The polymers disclosed may optionally include (meth) acrylate comonomer and/or maleimide comonomer. The comonomer may be n-butyl acrylate or N-phenyl maleimide or combinations thereof. The n-butyl acrylate or the N-phenyl maleimide or combination thereof may be present in an amount of less than about 10 wt %, less than about 7 wt %, or less than 5 wt %. The n-butyl acrylate or N-phenyl maleimide may be present in an amount greater than about 0.1 wt %, greater than about 0.5 wt %, greater than about 1 wt % or greater than about 2 wt %.

The polymers disclosed herein, which are made by a mass or solution process may contain trimers containing styrene and/or acrylonitrile at an amount of less than about 0.50 wt %, less than about 0.45 wt %, less than about 0.40 wt %, less than about 0.30 wt %, less than about 0.25 wt %, or less than about 0.20 wt %. The polymers disclosed herein may contain trimers consisting of styrene and/or acrylonitrile at an amount of greater than about 0.05 wt %, greater than about 0.10%, greater than about 0.15 wt %, greater than about 0.25 wt %, greater than about 0.35 wt %, greater than about 0.43 wt %, or greater than about 0.47 wt %. The polymer may be a homopolymer such as for example, general purpose polystyrene (GPPS) or high impact polystyrene (HIPS). The polymer may be a copolymer such as, for example, an acrylonitrile-styrene (SAN) or acrylonitrile-butadiene-styrene (ABS).

Various techniques for producing the copolymers are disclosed. Examples of these known polymerization processes include bulk, mass-solution, or mass-suspension polymerization, generally known as mass polymerization processes. For a good discussion of how to make monovinylidene aromatic copolymer containing compositions see Modern Styrenic Polymers, Edited by John Schiers and Duane Priddy, Wiley, ISBN 0 471 497525. Also, for example, U.S. Pat. Nos. 3,660,535; 3,243,481; and 4,239,863. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or plug flow reactors. Such reactors can be used in series. Processes for use of the stirred tank reactors for preparing copolymers are disclosed in Modern Styrenic Polymers, Edited by John Schiers and Duane Priddy, Wiley, ISBN 0 471 49752 5, published in 2003, see pp 43-72. Alternatively, a parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example polybutadiene rubber may be dissolved in the monomer mixture before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed. Eventually, the free copolymer becomes a continuous phase (phase inversion). Some copolymer is occluded inside the rubber particles as well. Pre-phase inversion means that the rubber solution is a continuous phase and that no rubber particles are formed, and post phase inversion means that all of the continuous rubber phase has been converted to rubber domains and there is a continuous copolymer phase. Following the phase inversion, more matrix copolymer may be formed A feed with a functional monomer such as N-phenyl maleimide that increases the Tg of the matrix and the heat resistance of the product can be added in one or more locations throughout the polymerization process, the location(s) may be the same or different from where the co-monomers are added, for example, see U.S. Pat. Nos. 5,412,036 and 5,446,103. Desirably, the N-phenyl maleimide is present at the outset with all of the other comonomers such as styrene, butadiene and acrylonitrile.

A feed with a functional additive such as ethylene-bis stearamide, dialkyl adipates, polydimethylsiloxane, or other lubricants or release agents that increases the processability of the product can be added in one or more location throughout the polymerization, devolatilization and conveying process, the location(s) may be the same or different from where the co-monomers are added.

When a desirable monomer conversion level is obtained the polymerization mixture may be subjected to conditions sufficient to further cross-link the rubber and remove any unreacted monomer and solvent. Such cross-linking and removal of unreacted monomer, as well as removal of diluent or solvent, if employed, and other volatile materials is advantageously conducted employing conventional devolatilization techniques as described herein and desirably are done under mild conditions. Thereafter the polymer may be extruded, and bulk pellets obtained from a pelletizer.

The temperatures at which polymerization is conducted are dependent on a variety of factors including the specific initiator and, if present, type and concentration of rubber, comonomers, reactor set-up (for example, linear, parallel, recirculation, etc.), and reaction solvent, if any, employed. Polymerization temperatures from 60° C. to 250° C. may be employed, which typically are started at a lower temperature and then raise during the polymerization reaction. Desirably, the temperature ranges from about 80° C., 90° C., 100° C. or 105° C. to about 200° C., 180° C., 170° C. or 160° C. In a particular embodiment containing rubber a first temperature range of about 60° C. to about 120° C. may be employed prior to phase inversion with temperatures from 100° C. to 250° C. or 200° C. being employed subsequent to phase inversion. Mass polymerization at such elevated temperatures is continued until the desired conversion of monomers to polymer is obtained. The time of polymerization may be any practicable such as known in the art and typically may range from several minutes to 24 hours, but generally is from about 1 hour to about 8 or 6 hours.

Generally, conversion (also sometimes referred to as percent solids) of from 55 to 90, or 60 to 85 weight percent of the monomers added to the polymerization system (that is, monomers added in the feed and any additional stream, including any recycle stream) to polymer is desired. Percent solids is the ratio of the weight of the solids (for example, rubber plus matrix (co)polymer) to the weight of the reaction mixture (for example, unpolymerized monomer(s)) expressed in percent at any specified time during the polymerization reaction.

To synthesize rubber-modified copolymers with high performance by the mass process, four aspects are important among many others. These aspects are grafting of the rubber substrate, particle formation or sizing, molecular weight distribution of the matrix, and cross-linking of the rubber particles at the completion point of the mass polymerization. Alternatively, a combination of mass and suspension polymerization techniques are employed. Using these techniques, following phase inversion and subsequent size stabilization of the rubber particles, the partially polymerized product can be suspended with or without additional monomers in an aqueous medium which contains a polymerized initiator and polymerization is subsequently completed.

A polymer's molecular weight is directly related to the entanglement effects contributing to its rheological and physical properties. The molecular weight of the matrix copolymer can be adjusted by the addition of a suitable chain transfer agent. Chain transfer agents, or molecular weight regulators, are substances which can undergo atom, group transfer or an addition-elimination. Organic molecules with labile hydrogens are well known, for example, alpha-methyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as, allyl halides, allyl sulfides, and terpenes such as terpinoline. Also transition metal complexes as cobalt(II) porphyrin complexes can be used as transfer agent. Chain transfer agents are added in an amount from about 0.0001 to 10 weight percent based on the weight of the reaction mixture (that is, rubber, monomer(s), and solvent, if any). The chain transfer agent may be added in an amount equal to or greater than about 0.001 weight percent, about 0.002, or about 0.003 weight percent based on the weight of the reaction mixture. The chain transfer agent may be added in an amount equal to or less than about 0.5 weight percent, about 0.2, or about 0.1 weight percent based on the weight of the reaction mixture.

The chain transfer agent may be added all at once in one reactor zone or it may be added in two or more reactor zones. Chain transfer agent may be added before phase inversion, during rubber particle sizing, more may be added after particle sizing to help control the matrix molecular weight, and optionally more may be added later to fine tune the matrix molecular weight/molecular weight distribution. The chain transfer agent may be added at the beginning of the polymerization (in other words, at a time where the percent solids for the reaction mixture is equal to the weight percent rubber) in a first amount equal to or greater than 0.001 weight percent, from about 0.002 and about 0.1 weight percent, or from about 0.003 and about 0.05 weight percent based on the weight of the reaction mixture. The amount of chain transfer agent added later, for example after about 40 percent solids or 30 percent solids, is added in a second amount equal to or less than about 0.7 weight percent, about 0.001 to about 0.6 weight percent, or from about 0.002 to about 0.5 weight percent based on the weight of the reaction mixture. The molecular weight of the matrix copolymer depends on, among other things, how much chain transfer agent is used and when it is added.

Also disclosed herein is a method for reducing the amount of trimers consisting of styrene and/or acrylonitrile in a styrenic polymer made by mass or solution process. The method includes the steps of using mild polymerization temperatures and devolatilization conditions of the polymerization mixture and including more than one initiator in the polymerization mixture, which are desirably added at the same time during the process and, in particular, at the outset or initiation of the polymerization. For example, the initiators may all be included in one or more of the monomer feeds. The styrenic polymer may be, but is not limited to, any of the polymers disclosed herein.

Styrenic resins may be made by chemical initiation, thermal initiation or more typically a combination of both. The trimers may comprise between 0 and 3 styrene monomer units and between 0 and 3 acrylonitrile monomer units, wherein the total monomer units equals 3 (e.g., styrene trimer, styrene-acrylonitrile trimer or acrylonitrile trimer). The amount of trimers may be determined by a suitable method such as high performance liquid chromatography (H PLC) techniques, which are known in the art.

In general the T (1 hr) half-life of one initiator (also referred to herein as "later initiator(s)" or "second initiator(s)") should be greater than the T (1 hr) half-life of the other initiator (also referred to herein as "first initiator"). The initiators may be added to the polymerization mixture separately at differing times during the polymerization, but desirably are added at the same time whether in separate feeds or mixed together and in particular at the outset of the polymerization such as being fed into the polymerization reactor with the initial monomer feeds or mixed with the monomers as they are being fed into the polymerization reactor. Further initiators than the plurality of initiators fed at the outset may be added later during the polymerization reaction, which may also include additional monomers or recycled material from the polymerization. The T (1 hr) half-life of the later initiators will be greater than the T (1 hr) half-life of the first initiator by about 10° C., about 15° C. or about 20° C. Typically the T (1 hr) half-life of the first initiator is between about 60° C. to 130° C.

The initiator may decompose homolytically. Exemplary initiators include, but are not limited to, dicumyl peroxide, 1,1, di(t-butylperoxy)cyclohexane, 2,5-dimethyl-2,5-di(t-butylperoxy)hexane, diisobutyryl peroxide, cumyl peroxyneodecanoate, di(3-methoxybutyl) peroxydicarbonate, 1,1,3,3-tetramethyl butyl peroxyneodecanoate, tert-amyl peroxyneodecanoate, di-sec-butyl peroxydicarbonate, diisopropyl peroxydicarbonate, di(4-tert-butylcyclohexyl) peroxydicarbonate, di(2-ethylhexyl) peroxydicarbonate, tert-butyl peroxyneodecanoate, dicetyl peroxydicarbonate, dimyristyl peroxydicarbonate, 1,1,3,3-tetramethylbutyl peroxypivalate, tert-amyl peroxypivalate, tert-butyl peroxypivalate, di(3,5,5-trimethylhexanoyl) peroxide, dilauroyl peroxide, didecanoyl peroxide, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxyisobutyrate, 1,1-di (tert-butylperoxy)-3,3,5-trimethylcyclohexane, 1,1-di(tert-amylperoxy)cyclohexane, 1,1-di(tert-butylperoxy)cyclohexane, tert-amylperoxy 2-ethylhexyl carbonate, tert-amyl peroxyacetate, tert-butyl peroxy-3,5,5-trimethylhexanoate, 2,2-di(tert-butylperoxy)butane, tert-butylperoxy isopropyl carbonate, tert-butylperoxy 2-ethylhexyl carbonate, tert-amyl peroxybenzoate, tert-butyl peroxyacetate, butyl 4,4-di(tert-butyl peroxy)valerate, butyl 4,4-di(tert-butylperoxy)valerate, di (tert-butylperoxyisopropyl)benzene, 2,5-dimethyl-2,5-di(tert-butylperoxy)hexane, di-tert-butyl peroxide and 3,6,9-triethyl-3,6,9-trimethyl-1,4,7-triperoxonane. As noted above, a requirement is that the later initiators have different T (1 hr) half-lives, with the later initiators having higher T (1 hr) half-lives than the first initiator. Accordingly, selection of first initiators and second initiators is well within the ambit of the skilled artisan.

The first initiator may be present in any amount which enhances the polymerization of vinyl or vinylidene substituted aromatic polymers at lower temperatures with lower trimer formation. The first initiator may be present in an amount of about 10 ppm or greater based on the weight of the polymerizable composition, about 30 ppm or greater or about 50 ppm by weight or greater. The first initiator may be present in an amount of about 800 ppm or less based on the weight of the polymerizable composition, about 500 ppm or less or about 300 ppm or less. The amount is based on pure initiator and is not based on diluted compositions as often sold commercially. If diluted composition are used, recalculation to pure initiator is required.

The second initiator may be present in any amount which enhances the polymerization of vinyl or vinylidene substituted aromatic polymers at lower temperatures with lower trimer formation. The second initiator may be present in an amount of about 10 ppm or greater based on the weight of the polymerizable composition, about 30 ppm or greater or about 50 ppm or greater. The second initiator may be present in an amount of about 800 ppm or less based on the weight of the polymerizable composition, about 500 ppm or less or about 300 ppm or less.

As described above, the method may employ mild devolatilization conditions and still yield low trimer concentrations. More stringent finishing of the styrenic resin may be employed if desired, for example, to further reduce the amount of trimers. For example, use of higher vacuum, higher devolatilizer temperatures and larger devolatilizers during preparation of styrenic polymers may lead to resins with lower amounts of trimer, but surprisingly these may not be necessary when employing more than one initiator and, in particular when such initiators are employed at the outset of the polymerization to completion. Devolatilization may be performed at any suitable temperature such as between about 180° C. to about 300° C. or about 250° C., but desirably is less than about 240° C., 235° C. or 230° C. Pressure during devolatilization may be any suitable pressure such as from about 5, 10, or 20 mbar to about 1200, 1000, 800, 500, 200, 100 or 50. The time during devolatilization may be any useful time and generally varies from 2 to 3 minutes to 100, 50 or 30 minutes. In an embodiment, a one stage devolatilizer is employed even though two more devolatilizing stages may be employed as well as a preheating stage. When two stage devolatilizing is employed, the average temperature of the two stages may be the same as those described above as well as the average pressure.

In an embodiment, the polymer typically has a Vicat softening temperature of at least about 105° C., 106° C., 107° C. or greater to about 120° C., 115° C. or 112° C., when the polymer contains about 0.1% to 0.5% of trimers and from 0.1%, 0.25%, 0.5%, 1% to 5% or 4% by weight of N-phenyl maleimide and in particular when the styrene polymer is comprised of an unsaturated nitrile and N-phenyl maleimide with illustrative examples being styrene acrylonitrile copolymers and ABS copolymers. The Vicat may be determined by known standards such as ASTM D 1525 or ISO 306 employing Vicat A test method (A50 method).

Disclosed are articles prepared from the compositions disclosed herein. Such articles may be fabricated in any known manner commonly used with polymers containing one or more vinylidene substituted aromatic compounds. The articles may be fabricated by molding, extrusion, thermoforming, foaming, blow molding, injection molding, extrusion blow molding and combinations thereof. The articles may be molded, extruded, extruded and molded, and the like. The articles disclosed may exhibit glass transition temperatures of about 100° C. or less. The articles disclosed may be transparent or opaque.

Illustrative Embodiments

The following examples are provided to illustrate the invention but are not intended to limit the scope thereof. All parts and percentages are by weight unless otherwise indicated.

Example 1: Reducing Trimers in a High Heat ABS Polymer Which Includes N-phenyl maleimide as Comonomer The comparative example is based on the use of a single initiator and a standard temperature profile. The reactor set-up consists of four stirred tube reactors in series, each having three zones, followed by two stage devolatilization having an average temperature of about 210° C. to 218° C. The residence time per zone is 20 minutes, per reactor the residence time is 1 hour. The composition of the feed is 16.9 wt % acrylonitrile, 52.2 wt % styrene, 21.2 wt % ethyl benzene and 9.7 wt % polybutadiene rubber. As initiator, 115 ppm (based on feed) Trigonox 22 is added in the feed. A certain amount of N-phenyl maleimide is added to boost the heat resistance (about 3.8 weight % of the final product). The example of the invention is made with the same hardware and devolatilization, but using two initiators and an optimized temperature profile. The composition of the feed is 16.9 wt % acrylonitrile, 49.4 wt % styrene, 24.0 wt % ethyl benzene and 9.7 wt % polybutadiene. As initiator cocktail 115 ppm (based on feed) Trigonox 22 and 200 ppm (based on feed) Trigonox 101 is used. The same amount of N-phenyl maleimide is added. The temperature profiles for the examples is summarized in Table 1. Table 2 shows the trimer concentration for both conditions and the Vicat.

TABLE 1

| | | Zone temperatures (° C.) | | |
|---|---|---|---|---|
| Reactor | Zone | Normal T | New T | Delta T |
| 1 | 1 | 106 | 106 | 0 |
| | 2 | 114 | 112 | 2 |
| | 3 | 117.5 | 114 | 3.5 |
| 2 | 4 | 123 | 116 | 7 |
| | 5 | 127 | 118 | 9 |
| | 6 | 130 | 120 | 10 |
| 3 | 7 | 138.5 | 122 | 16.5 |
| | 8 | 142 | 124 | 18 |
| | 9 | 144 | 126 | 18 |

TABLE 1-continued

| | | Zone temperatures (° C.) | | |
|---|---|---|---|---|
| Reactor | Zone | Normal T | New T | Delta T |
| 4 | 10 | 158 | 128 | 30 |
| | 11 | 165 | 135 | 30 |
| | 12 | 160 | 160 | 0 |

The results are show in Table 2

TABLE 2

| | Trimers consisting of styrene and/or acrylonitrile (wt %) | Ethyl Benzene (ppm) | Styrene (ppm) | Vicat (° C.) |
|---|---|---|---|---|
| Old Operation | 0.81 | 270 | 120 | 104.8 |
| New Operation | 0.33 | 350 | 70 | 108.7 |

Referring now to the FIGURE, illustrated is the effect on Vicat of varying trimer amount in a high heat ABS polymer which includes a constant amount of N-phenyl maleimide (3.7-4.0 wt % based on final product). Vicat as used herein is measured with a load of 50 N and with a heating rate of 50° C./hr (ISO 306 standard). The data of the FIGURE results in a linear regression equation of y=−6.3693x+110.42. Thus, a trimer content of about 0.5 weight percent realizes a Vicat of about 107.2° C. when an ABS copolymer contains about 3.8% by weight N-phenyl maleimide. Likewise, a trimer content of about 0.4 weight percent realizes a Vicat of about 107.9° C.

What is claimed is:

1. A method of reducing the amount of trimers consisting of styrene and/or acrylonitrile in a styrenic polymer made by mass or solution process comprising:
providing a polymerization reaction mixture comprised of styrene, acrylonitrile, and more than one initiator, and reacting the polymerization reaction mixture at a polymerization temperature within a range of 112° C. to 250° C., with at least one polymerization temperature being at least 160° C. wherein the polymerization reaction mixture is further comprised of N-phenyl maleimide, the one or more initiators of the polymerization reaction mixture is comprised of a first and a second initiator, the second initiator having a T (1 hr) half-life that is higher than the T (1 hr) half-life of the first initiator, the T (1 hr) half-life of the second initiator being at least 20° C. higher than the T (1 hr) half-life of the first initiator, and the second initiator is present in an amount that is greater than the first initiator.

2. The method of claim 1, wherein the amount of trimers is less than 0.5 weight percent of the styrenic polymer.

3. The method of claim 2, wherein the amount of trimers is greater than 0.1 weight percent of the styrenic polymer.

4. The method of claim 2, wherein the amount of trimers is less than 0.4 weight percent of the styrenic polymer.

5. The method of claim 1, wherein the first initiator is present in an amount of 60 to 115 ppm and the second initiator is present in an amount from 200 ppm to 800 ppm to.

6. The method of claim 5, wherein the amount of the second initiator is 200 ppm to 300 ppm, the T (1 hr) half-life of the first initiator being at least 112° C., and the T (1 hr) half-life the second initiator being at least 134° C.

7. A method of reducing the amount of trimers consisting of styrene and/or acrylonitrile in a styrenic polymer made by mass or solution process comprising:

providing a polymerization reaction mixture comprised of styrene, acrylonitrile, and more than one initiator, and reacting the polymerization reaction mixture at a polymerization temperature within a range of 60° C. to 250° C., wherein the polymerization reaction mixture is further comprised of N-phenyl maleimide, and one or more of maleic acid, fumaric acid, maleic anhydride, dimethyl maleate, diethyl maleate, dibutyl maleate, dimethyl fumarate, diethyl fumarate or dibutyl fumarate.

8. The method of claim 1, wherein the polymerization temperature range is from 112° C. to 200° C.

9. The method of claim 1, wherein the reacting is raised from a lower temperature to a higher temperature within the range of polymerization reaction temperatures.

* * * * *